United States Patent [19]

Hashimoto et al.

[11] Patent Number: 5,030,481
[45] Date of Patent: Jul. 9, 1991

[54] PROCESS OF PRODUCING MAGNETIC RECORDING MEDIUM

[75] Inventors: Hiroshi Hashimoto; Hideomi Watanabe, both of Kanagawa, Japan

[73] Assignee: Fuji Photo Film Co., Ltd., Kanagawa, Japan

[21] Appl. No.: 531,421

[22] Filed: May 31, 1990

[30] Foreign Application Priority Data

May 31, 1989 [JP] Japan .................................. 1-138770

[51] Int. Cl.$^5$ .............................................. B05D 5/12
[52] U.S. Cl. .................................... 427/130; 427/128; 428/694; 428/900
[58] Field of Search ............................. 427/127-130, 427/131, 132, 48; 428/694, 400

Primary Examiner—Bernard Pianalto
Attorney, Agent, or Firm—Sughrue, Mion, Zinn, Macpeak & Seas

[57] ABSTRACT

A process of producing a magnetic recording medium comprising the steps of kneading ferromagnetic fine particles and a binder using an organic solvent to prepare a kneaded mixture, dispersing said kneaded mixture with the addition of an additional binder and/or an additional organic solvent to prepare a magnetic coating composition, and coating said magnetic coating composition on a non-magnetic support followed by drying, wherein the crystalline size of said ferromagnetic fine particles is not larger than 350 angstrom and said binder used at the kneading step comprises (1) an amine type epoxy compound represented by following formula:

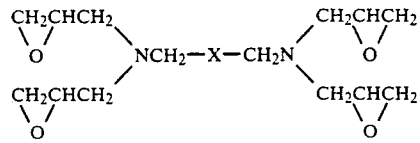

wherein A represents

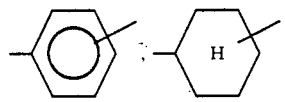

or an alkylene group having from 1 to 10 carbon atoms, (2) a vinyl chloride copolymer having a polar group and an organic side chain group having a hydroxyl group at the terminal, and (3) a urethane resin having at least 3 hydroxyl groups in the molecule.

13 Claims, No Drawings

PROCESS OF PRODUCING MAGNETIC RECORDING MEDIUM

FIELD OF THE INVENTION

The present invention relates to a process of producing magnetic recording medium comprising a non-magnetic support having thereon a magnetic layer composed of ferromagnetic particles dispersed in a binder, and more particularly to a process of producing a magnetic recording medium excellent in running property and durability and having excellent electromagnetic conversion characteristics.

BACKGROUND OF THE INVENTION

Magnetic recording media are widely used as audio tapes, video tapes, computer tapes, floppy disks, etc. A magnetic recording medium fundamentally has a structure in that a magnetic layer composed of ferromagnetic fine particles dispersed in a binder is formed on a non-magnetic support.

A magnetic recording medium is fundamentally required to be in high levels in various properties such as electromagnetic conversion characteristics, running durability, and running performance. In particular, with the recent increased propagation of 8 mm video tape recorders, etc., a video tape is required to have, in particular, excellent electromagnetic conversion characteristics such as a high video output and excellent original image reproducing faculty.

While there are various methods for improving the electromagnetic conversion characteristics of a magnetic recording medium, a method of improving the properties of ferromagnetic fine particles as a magnetic recording substance is a direct and effective method. Accordingly, the size of ferromagnetic particles becomes finer and finer for enabling high density recording and the material for ferromagnetic particles turns from iron oxide to iron oxide modified by a foreign metal such as cobalt, etc., and further recently, a ferromagnetic metal such as ferromagnetic iron, nickel, or cobalt or a ferromagnetic alloy of these metals has been used.

By using the ferromagnetic particles improved as described above, a magnetic recording medium having improved electromagnetic conversion characteristics can be theoretically obtained but, practically, it is difficult to produce a magnetic recording medium having improved electromagnetic conversion characteristics matching with the improvement of the ferromagnetic particles. The reason is as follows. That is, as the size of ferromagnetic particles is finer, the dispersibility of the ferromagnetic particles tends to reduce. As the property of ferromagnetic particles, there is the tendency that the dispersibility becomes lower and lower in the order of γ-iron oxide, Co-doped γ-iron oxide, and ferromagnetic metal (or alloy) fine particles. Thus, the improvement of ferromagnetic particles rather encounters a problem of reducing the dispersed state of the ferromagnetic particles in the magnetic layer, thereby the excellent characteristics of the ferromagnetic particles are not sufficiently obtained.

For improving the dispersibility of ferromagnetic fine particles, binders having a polar group such as -SO$_3$M, -OSO$_3$M, -PO$_3$M$_2$, -OPO$_3$M$_2$, or -COOM (wherein M represents a hydrogen atom, an alkali metal or ammonium) or binders having both the aforesaid polar group and an epoxy ring are disclosed, e.g., in JP-B-58-41565 (the term "JP-B" as used herein means an "examined Japanese patent publication"), JP-A-57-44227, 59-30235, 60-238306, 60-238309, and 60-238371 (the term "JP-A" as used herein means as "unexamined published Japanese patent application"). These binders have a high absorptive power to ferromagnetic fine particles and show good dispersibility as compared to conventional binders.

However, even in the case of using such an improved binder, when the particle sizes of ferromagnetic particles become finer and finer for high density recording, the dispersion thereof become more difficult and hence the development of a technique of giving a binder having a faculty of highly dispersing such finer ferromagnetic particles has been desired.

For improving the dispersed state of ferromagnetic fine particles, there is a method of conducting kneading and dispersion of magnetic coating composition for a long period of time at the preparation of the coating composition but in this method, a considerable shearing force is applied to ferromagnetic fine particles at kneading and dispersing, thereby the properties of the ferromagnetic fine particles may be reduced, and further the long time required for the production of a magnetic recording medium gives a problem in production efficiency.

Also, a method of kneading magnetic composition using a specific binder such as a water-soluble carboxylic acid resin (JP-B-57-42888) or polyvinyl butyral (JP-A-59-165237) and then dispersing the mixture with the addition of other binder and solvent is proposed but a sufficient dispersion effect has not yet obtained.

Accordingly, a method of effectively dispersing the aforesaid ferromagnetic fine particles without largely changing conventional production processes of magnetic recording medium has been investigated and as such a method, there are known a method of using ferromagnetic particles subjected to a surface treatment with a surface treating agent such as a silane coupling agent, a method of using a component (dispersing agent) capable of improving the dispersibility of ferromagnetic particles, such as fatty acids, and a method of using a mixture of a vinyl copolymer and a urethane prepolymer added with a low molecular weight epoxy resin as disclosed in JP-B-56-23210.

However, in the aforesaid ferromagnetic particles subjected to the surface treatment using the silane coupling agent, the surface of the ferromagnetic particles is rendered hydrophobic by the silane coupling agent, thereby the compatibility of the ferromagnetic particles with resin components a binder is reduced although the stability in the dispersed state of the ferromagnetic particles in the magnetic coating composition is usually improved. Therefore, in the method, the final dispersed state of the ferromagnetic particles in the magnetic layer may not be sufficiently improved. Furthermore, since the silane coupling agent itself is very expensive, there is a problem in the use of such an expensive material for treating ferromagnetic particles for an ordinary magnetic recording medium.

A fatty acid, which is usually contained in a magnetic layer of a magnetic recording medium as a lubricant, also has a dispersing action for ferromagnetic particles. Thus, by controlling the amount of the fatty acid being used, the dispersed state of ferromagnetic particles can be improved but in general, when a fatty acid is used as a dispersing agent, a larger amount of the fatty acid must be used for obtaining the sufficient effect than the usual case of using the fatty acid as a lubricant for a magnetic layer. On the other hand, it is known that when a fatty acid is used in an excessive amount, it acts as a plasticizer for a binder. Therefore, when a fatty acid is used as a dispersing agent for ferromagnetic particles, there inevitably occurs a problem that the binder is plasticized by the fatty acid.

Apart from the above, there is a problem that by improving the dispersed state of ferromagnetic particles, the smoothness of the surface of the magnetic recording medium is increased to reduce the running property of the magnetic recording medium. For example, the dispersed state of ferromagnetic particles can be improved by using a large amount of a fatty acid but in this case, the magnetic recording medium is insufficient in durability and running property.

Also, when a low molecular weight epoxy resin is added to the specific binder as described above, the binder containing the epoxy resin is kneaded with ferromagnetic and the kneaded mixture is coated on a support. However, in this case, the kind of the binder being used is limited as well as the improvement of the dispersibility of ferromagnetic particles is insufficient, and if the kneading time is prolonged, the aforesaid problem that the characteristics of the ferromagnetic particles are reduced occurs.

It is known that a low molecular weight epoxy compound is incorporated in a binder as disclosed in JP-A-63-146218, and the epoxy compound is used as a component for a binder as in the case of JP-B-56-23210.

However, since in the magnetic recording medium described above, large amounts of binder and solvent are used for kneading and dispersing ferromagnetic particles, it is impossible to sufficiently strongly knead the composition.

Furthermore, if the particle sizes of ferromagnetic particles become very fine, the mechanical strength and the elasticity of the magnetic layer obtained by coating and drying the magnetic coating composition are increased but the shearing elongation of the magnetic layer is reduced and the magnetic layer becomes very brittle. Accordingly, powder dropping from the magnetic layer during VTR running is increased, and the troubles at the slitting step, i.e., the occurrence of cracks at the edge portions of the magnetic layer and the occurrence of powder dropping, are liable to occur.

SUMMARY OF THE INVENTION

An object of the present invention is, therefore, to provide a process of producing a magnetic recording medium having very excellent electromagnetic conversion characteristics and a very tough mechanical property of the magnetic layer, such as high durability and running property, by highly dispersing ferromagnetic fine particles having very fine particle sizes.

Another object of the present invention is to provide a process of producing a magnetic recording medium with a shortened time required for dispersing magnetic coating composition, with less trouble of powder dropping at slitting step, and with a reduced production cost.

Other objects and effects of the present invention will be apparent from the following description.

The present invention therefore provides a process of producing a magnetic recording medium comprising the steps of kneading ferromagnetic fine particles and binder using a solvent to prepare a kneaded mixture, dispersing the kneaded mixture with the further addition of an additional binder and/or an additional solvent to prepare a magnetic coating composition, and coating the magnetic coating composition on a non-magnetic support followed by drying, wherein the crystallite size of the ferromagnetic fine particles is not larger than 350 angstrom and the binder used at the kneading step comprises (1) an amine type epoxy compound represented by following formula:

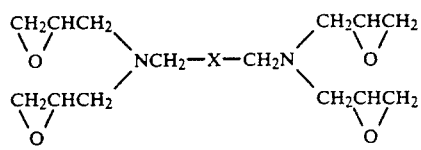

wherein X represents

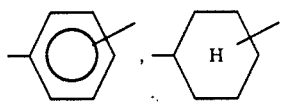

or an alkylene group having from 1 to 10 carbon atoms, (2) a vinyl chloride copolymer having a polar group and an organic side chain group having a hydroxyl group at the terminal, and (3) a urethane resin having at least 3 hydroxyl groups in the molecule.

DETAILED DESCRIPTION OF THE INVENTION

According to the present invention, a magnetic recording medium having improved dispersibility and electromagnetic conversion characteristics as well as improved durability and running property is obtained by strongly kneading ferromagnetic fine particles having crystallite sizes of 350 angstrom or less using the specific epoxy compound shown by the aforesaid formula, the aforesaid vinyl chloride copolymer having specific functional groups (i.e., a hydroxyl group via an organic side chain group and a polar group), and the aforesaid urethane resin as a binder and a solvent and then dispersing the kneaded mixture using additional binder and/or solvent.

Tee kneading step is carried out by strongly kneading the aforesaid mixture using a press kneader, an open kneader, etc. and the dispersing step is carried out by dispersing the kneaded mixture using a sand mill, a ball mill, etc.

The amine type epoxy compound used as a binder component in the present invention is represented by the following formula:

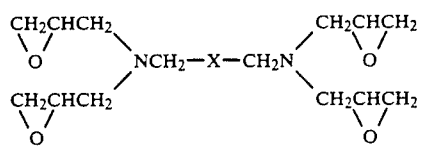

wherein X represents

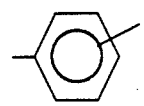

(o, m, or p),

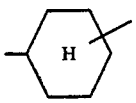

(o, m, or p), or an alkylene group having from 1 to 10 carbon atoms.

The epoxy compound is also commercially available as "TETRAD-C", "TETRAD-X" (trade names, made by Mitsubishi Gas Chemical Industries, Ltd.), etc.

The aforesaid amine type epoxy compound is contained in the magnetic layer in an amount of generally from 0.1 to 5 parts by weight per 100 parts by weight of ferromagnetic fine particles. When the content of the amine type epoxy compound is in the range of from 0.15 to 4 parts by weight, the dispersion state of ferromagnetic fine particles is further improved, such as the luster of the surface of the magnetic layer is increased, and further mechanical strength and shearing elongation of the coated layer of the magnetic coating composition are improved. Furthermore, when the content of the amine type epoxy compound is in the range of from 0.2 to 35 parts by weight, the electromagnetic conversion characteristics and the durability of the magnetic recording medium are particularly greatly improved.

If the content thereof is less than 0.1 part by weight, the effect of compounding the epoxy compound tends to be not effectively obtained and even if the content thereof is larger than 5 parts by weight, it tends to happen that the further improvement of the dispersion state of ferromagnetic particles and the mechanical strength of the coated magnetic layer are not obtained.

The vinyl chloride copolymer used in the present invention has a polar group and at least one kind of a side chain having -OH at the terminal. Preferred examples of the organic side chain group include those represented by formula (1), (2), and (3):

  (1)

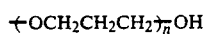  (2)

  (3)

wherein n represents an integer of from 1 to 15 and $R^1$ and $R^2$, which may be the same or different, each represents a hydrogen atom or an alkyl group.

Preferred examples of the polar group include $-SO_3M$, $-OSO_3M$, $-PO_3M_2$, $-OPO_3M_2$, and $-CO_2M$ (wherein M represents a hydrogen atom, an alkali metal, or ammonium and when two or more M's exist in one molecule, the M's may be the same or different), and more preferred examples thereof include $-SO_3M$ or $-OPO_3M_2$.

The content of the side chain having -OH at the terminal is preferably from $1 \times 10^{-5}$ to $2 \times 10^{-3}$ equivalent, and more preferably from $1 \times 10^{-4}$ to $1 \times 10^{-3}$ equivalent, per gram of the vinyl chloride copolymer. If the content is less than the aforesaid range, the effect of improving the mechanical strength tends to be degraded, and if the content is larger than the range, the dispersibility tends to be reduced.

The content of the polar group is preferably from about $1 \times 10^{-7}$ to $1 \times 10^{-3}$ equivalent, and more preferably from $1 \times 10^{-5}$ to $1 \times 10^{-4}$ equivalent, per gram of the copolymer. If the content is outside the aforesaid range, the dispersibility of ferromagnetic particles tends to be reduced and also the electromagnetic conversion characteristics tends to be reduced. The vinyl chloride copolymer may have one or more kinds of such polar groups.

The weight average molecular weight of the vinyl chloride copolymer is generally from 20,000 to 100,000, and preferably from 30,000 to 80,000. If the weight average molecular weight is outside the aforesaid range, the dispersibility tends to be reduced or the durability of the magnetic recording medium tends to be reduced.

Examples of monomers, which can be copolymerized with vinyl chloride to form the vinyl chloride copolymer used in the present invention, include a fatty acid vinyl ester, e.g., vinyl acetate and vinyl propionate; a alkyl acrylate or methacrylate, e.g., methyl acrylate, ethyl acrylate, propyl acrylate, lauryl acrylate, stearyl acrylate, methyl methacrylate and ethyl methacrylate; vinylidene chloride; maleic acid; acrylic acid; methacrylic acid; acrylonitrile; ethylene; styrene; etc.

The polyurethane resin being used in the present invention has 3 or more hydroxyl groups (-OH) in one molecule.

The polyurethane resin can be fundamentally produced from a polyol, a diisocyanate, and if necessary, a chain extending agent by a known method, wherein a material or materials each having a hydroxyl group of different reactivity are used as the aforesaid polyol and/or the chain extending agent.

The polyurethane resin can be also produced by ringopening the epoxy group of an epoxy group-containing polyurethane resin, which can be synthesized, for example, by using a polyol having an epoxy group in the aforesaid known production method of polyurethane.

As the aforesaid polyol, polyols having any skeleton can be used if the polyols have two or more hydroxyl groups (-OH), and examples of the skeleton for the polyol include polyether polyols, polyester polyols, polycarbonate polyols, polycaprolactone polyols, and copolymer polyols of them. However, when a chain extending agent is not used, it is necessary to use a polyol having 3 or more hydroxyl groups.

Typical examples of the aforesaid polyether polyol as a skeleton include polyalkylene glycols such as polyethylene glycol, polypropylene glycol, etc.

The polyester polyol as a basic skeleton can be synthesized, e.g., by a polycondensation of a dihydric alcohol and a dibasic acid or by a ring-opening polymerization of lactone such as caprolactone. Typical examples of the dihydric alcohol are ethylene glycol, propylene glycol, butanediol, 1,6-hexanediol, and cyclohexane dimethanol. Also, typical examples of the dibasic acid include acid, pimelic acid, azelaic acid, sebacic acid, phthalic acid, and terephthalic acid.

Examples of the aforesaid polycarbonate polyol as a skeleton include a polycarbonate polyol having a molecular weight of from 300 to 20,000 and a hydroxyl value of from 20 to 300 synthesized by a condensation of a polyhydric alcohol shown by formula (I):

$$HO-R^1-OH \qquad (I)$$

wherein $R^1$ represents $-(CH_2)_n-$ (wherein n represents and integer of from 3 to 14),

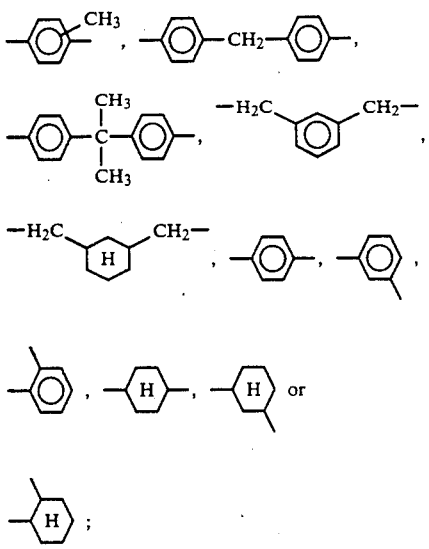

and phosgene, chloroformic acid ester, a dialkyl carbonate or a diaryl carbonate, or an ester interchange of the aforesaid polyhydric alcohol and a polycarbonate polyester polyol having a molecular weight of from 400 to 30,000 and a hydroxyl value of from 5 to 300 obtained by a condensation of the aforesaid polycarbonate polyol and a dicarboxylic acid represented by formula (II):

$$HOOC-R^2-COOH \qquad (II)$$

wherein $R^2$ represents an alkylene group having from 3 to 6 carbon atoms, a 1,4-, 1,3- or 1,2-phenylene group, or a 1,4-, 1,3-, or 1,2-cyclohexylene group.

The aforesaid polyol may be compounded with other polyol such as a polyether polyol, polyester ether polyol, or a polyester in an amount of less than 90% by weight of the aforesaid polyol.

Also, the polyol may further have a polar functional group such as -SH, -COSH, -CSSH, -SO$_3$M, -COOM, -OPO(OM)$_2$ (wherein M represents a hydrogen atom, Na, K,, or Li), an epoxy group, an amino group, etc., in addition to the hydroxyl groups. In particular, the use of the polyurethane produced by using the polyol having an S-containing group such as -SH, -COSH, and -CSSH is preferred since in this case, the curing reaction with a polyisocyanate which is a component of the binder for the magnetic layer proceeds uniformly and the durability of the magnetic recording medium is more improved.

There is no particular restriction of a diisocyanate which is used for forming the polyurethane by the reaction with the aforesaid polyol, and diisocyanates ordinary used can be used. Examples of the diisocyanate are hexamethylene diisocyanate, toluidine diisocyanate, isophorone diisocyanate, 1,3-xylylene diisocyanate, 1,4-xylylene diisocyanate, cyclohexane diisocyanate, toluidine diisocyanate, 2,4-tolylene diisocyanate, 2,6-tolylene diisocyanate, 4,4,-diphenylmethane diisocyanate, p-phenylene diisocyanate, m-phenylene diisocyanate, 1,5-naphthylene diisocyanate, 4,4-diphenylmethane diisocyanate, 3,3-dimethylphenylene diisocyanate, and dicyclohexylmethane diisocyanate.

Examples of the chain extending agent include the above-described polyhydric alcohols, aliphatic polyamines, alicyclic polyamines, and aromatic polyamines, and further the aforesaid compounds having hydroxyl groups each having a different reactivity.

The polyurethane resin, which is used as a component of the binder for the magnetic recording medium of the present invention, has at least 3, preferably from 4 to 50, and more preferably from 5 to 30 of hydroxyl groups. If the number of hydroxyl groups of the polyurethane resin is less than the aforesaid range, the curing property is insufficient to reduce the durability of the magnetic recording medium, while if the number of hydroxyl groups is larger than the aforesaid range, a gel is liable to from at the synthesis of polyurethane, whereby the filtration of the synthesized product becomes insufficient to form uneven product.

The weight average molecular weight of the aforesaid polyurethane is preferably from 5,000 to 200,000, more preferably from 20,000 to 120,000, and particularly preferably from 30,000 to 80,000. If the weight average molecular weight of the polyurethane resin is less than the aforesaid range, the durability of the magnetic recording medium tends to be inferior and if the weight average molecular weight is larger than the aforesaid range, the polyurethane resin tends to be inferior in solubility, which is undesirable for the preparation of the magnetic coating composition.

Furthermore, it is preferred that the glass transition point of the polyurethane resin is not higher than 30° C. If the glass transition point of the polyurethane resin is over 30° C, the processing property of the magnetic recording medium at a calendar treatment tends to be reduced.

In the magnetic recording medium of the present invention, the content of the aforesaid polyurethane resin in the binder is generally from 10 to 70% by weight, and preferably from 15 to 40% by weight, based on the amount of the total binder. The term "total binder" used herein means the binder components which include the vinyl chloride copolymer and the polyurethane resin as well as other binder components such as polyisocyanate, but does not include the amine type epoxy compound used in the present invention. If the content of the polyurethane resin is less than the aforesaid range, the running property and durability of the magnetic recording medium tend to be reduced, while if the content thereof is larger than the aforesaid range, running property tends to be reduced such as staining of a magnetic head.

The aforesaid vinyl chloride copolymer and polyurethane resin function as binders for binding ferromagnetic particles.

In addition to the vinyl chloride copolymer and the polyurethane resin, other resin(s) can also be used together as the binder for forming the magnetic layer. Examples of such resin include an ethylene/vinyl acetate resin, a polyvinyl butyral resin, an epoxy resin, and a phenoxy resin. These resins may be used singly or a combination of them.

In the present invention, the content of the aforesaid specific vinyl chloride copolymer contained in the magnetic layer is preferably from 20 to 80% by weight, and more preferably from 30 to 70% by weight based on the amount of the total binder.

The magnetic coating composition in the present invention may further contain a polyisocyanate compound.

As the polyisocyanate compound, polyisocyanates which are conventionally used as a curing component for polyurethane resins can be used.

Examples of the polyisocyanate compound being used in the present invention include a reaction product of 3 moles of tolylene diisocyanate and 1 mole of trimethylolpropane (e.g., Desmodur L-75, trade name, made by Farbenfabriken Bayer A.G.), a reaction product of 3 moles of a diisocyanate such as xylylene diisocyanate, hexamethylene diisocyanate, etc., and 1 mole of trimethylolpropane, a biuret addition compound of 3 moles of hexamethylene diisocyanate, an isocyanurate compound of 5 moles of tolylene diisocyanate, an isocyanurate addition compound of 3 moles of tolylene diisocyanate and 2 moles of hexamethylene diisocyanate, and a polymer of isophorone diisocyanate and diphenylmethane diisocyanate.

The content of the aforesaid polyisocyanate compound contained in the magnetic layer is preferably in the range of from 10 to 50% by weight, and more preferably in the range of from 20 to 40% by weight based on the amount of the total binder.

Furthermore, a binder system wherein an acrylic acid ester oligomer and monomer are additionally used for the binder and the binder is cured by the irradiation of radiations after coating can also be used in the present invention.

The content of the total binders in the magnetic layer of the magnetic recording medium of the present invention is generally from 10 to 100 parts by weight, and preferably from 20 to 40 parts by weight, per 100 parts by weight of the ferromagnetic fine particles in the magnetic layer.

As ferromagnetic fine particles which are kneaded with the amine type epoxy compound and the aforesaid binders for forming a magnetic layer in the present invention, there are ferromagnetic alloy fine particles, ferromagnetic iron oxide fine particles, Co-doped ferromagnetic iron oxide fine particles, ferromagnetic chromium dioxide fine particles, barium ferrite fine particles, etc.

The acicular ratio of ferromagnetic alloy fine particles, Co-doped ferromagnetic ion oxide fine particles, ferromagnetic iron oxide fine particles, and ferromagnetic chromium dioxide fine particles is generally from about 2/1 to 20/1, and preferably at least 5/1, and a mean particle length thereof is preferably in the range of from about 0.2 μm to 2.0 μm.

In the present invention, when the crystallite sizes of the ferromagnetic fine particles are 350 angstrom or less, the effect of the present invention is particularly remarkable, and when the crystallite sizes are 250 angstrom or less, the effect is far more remarkable. The "crystallite size" used herein are determined by an X-ray diffractiometry. Also, the effect of the invention becomes large when the pH of the ferromagnetic alloy fine particle is at least 8.

However, even when the crystallite sizes are larger than the aforesaid range, the effect of improving the electromagnetic conversion characteristics, the running property, and the durability of the magnetic recording medium can be obtained by using the technique according to the present invention, but the effect is particularly remarkable when the crystallite sizes of the ferromagnetic alloy particles are less than the aforesaid value.

In the ferromagnetic alloy fine particles which are preferably used in the present invention, the content of metal components is preferably at least 75% by weight and at lest 80% by weight of the metal components is preferably a ferromagnetic metal or alloy (i.e., Fe, Co., Ni, Fe-Ni, Co-Ni, or Fe-Co-Ni).

Examples of the organic solvent which is used in the step of kneading a mixture for forming a magnetic coating composition, the step of dispersing the mixture, and the step or coating the magnetic coating composition, include ketone solvents such as acetone, methyl ethyl ketone, methyl isobutyl ketone, cyclohexanone, etc.; ester solvents such as methyl acetate, ethyl acetate, butyl acetate, ethyl lactate, glycol acetate monoethyl ether, etc.; ether solvents such as ethyl ether, glycol dimethyl ether, glycol monoethyl ether, etc.; aromatic hydrocarbons such as benzene, toluene, xylene, etc.; and chlorinated hydrocarbons such as methylene chloride, ethylene chloride, carbon tetrachloride, chloroform, ethylenechlorohydrin, dichlorobenzene, etc.

At the preparation of the magnetic coating composition for producing the magnetic recording medium of the present invention by kneading the ferromagnetic fine particles, the amine type epoxy compound, the vinyl chloride copolymer, and the polyurethane resin described above, a definite amount of the ferromagnetic fine particles is placed in a kneader such as a pressure kneader, an open kneader, and a continuous kneader. Then, the amine type epoxy compound, the vinyl chloride copolymer, and the polyurethane resin described above are added thereto together with the aforesaid organic solvent and, as the case may be, other binder component(s) such that the total amounts of the binder components and the solvent become from 40 to 70 parts by weight per 100 parts by weight of the ferromagnetic fine particles followed by kneading. At this time, the amount of the binder to the solvent (binder/solvent) is preferably from 1/1 to ¼ by weight Kneading is carried out using the aforesaid pressure kneader or open kneader at a stress of from 30 to 50 kg/cm².

If the amount of the binder components and the solvent in the mixture for preparing the magnetic coating composition are less than 40 parts by weight, the mixture can not be kneaded sufficiently, while if the amounts are larger than 70 parts by weight, a strong stress is not applied due to the excessive amount of the solvent.

In the kneading step, the temperature is preferably in the range of from 0° to 100° C., and the kneading time is preferably in the range of from 1 to 5 hours.

As the solvent, ketone series solvents such as methyl ethyl ketone, methyl isobutyl ketone, cyclohexanone, etc.; ester solvents such as ethyl acetate, methyl acetate, etc.; or aromatic hydrocarbons such as toluene, xylene, etc., are preferred, and cyclohexanone is particularly preferred.

In the kneading step, the magnetic coating composition (the kneaded mixture) is in a very viscous state but in the subsequent dispersing step, by adding thereto the remaining binders and solvent, the viscosity of the mixture is reduced to preferably from about 1 to 500 poises. In the dispersing step, the amount of the solvent is preferably from 200 to 500 parts by weight per 100 parts by weight of the ferromagnetic fine particles.

Also, the magnetic coating composition in the present invention may further contain additives such as abrasive, lubricants, dispersing agents, antistatic agents, rust preventives, etc.

There is no particular restriction on the abrasive being used in the present invention if the Moh's hardness thereof is at least 5, and preferably at least 8. Examples of abrasive having a Moh's hardness of at least 5 are $Al_2O_3$ (Moh's hardness: 9), TiO (Moh's hardness: 6), TiO$_2$ (Moh's hardness: 6.5), SiO$_2$ (Moh's hardness: 7), SnO$_2$ (Moh's hardness: 6.5), Cr$_2$O$_3$ (Moh's hardness: 9), and α-Fe$_2$O$_3$ (Moh's hardness: 5). These abrasive can be used singly or as a mixture thereof. Abrasive having a Moh's hardness of at least 8 are particularly preferred.

If an abrasive having a Moh's hardness of lower than 6 is used, the abrasive is liable to drop off from the magnetic layer and the magnetic recording medium scarcely shows an abrasive action to a magnetic head, whereby clogging of head is liable to occur and the running durability of the magnetic recording medium becomes poor.

The content of the abrasive is usually from 0.1 to 20 parts by weight, and preferably from 1 to 15 parts by weight.

As the antistatic agent, carbon black (particularly those having a mean grain size of from 10 to 200 nm), etc. are preferably added.

As the lubricant which can be used int his invention, there are saturated or unsaturated fatty acids (such as myristic acid, stearic acid, oleic acid, etc.), metal soaps, N-substituted or N-unsubstituted fatty acid amides, fatty acid esters (such as fatty acid esters of various kinds of monoesters or polyhydric esters such as sorbitan, glycerin, etc.; esterification products of polybasic acids, etc.), ester compounds having an ether bond, higher aliphatic alcohols, monoalkyl phosphates, dialkyl phosphates, paraffins, silicone oils, animal oils, vegetable oils, mineral oils, high aliphatic amines, etc.; inorganic fine particles of graphite, silica, molybdenum disulfide, tungsten disulfide, etc.; fine particles of a resin or polymer such as polyethylene, polypropylene, polyvinyl chloride, an ethylene/vinyl chloride copolymer, polytetrafluoroethylene, etc.; α-olefin polymers; unsaturated aliphatic hydrocarbons which are liquids at normal temperature; terminal-denatured or undenatured perfluoroalkyl polyethers; and fluorocarbons.

Examples of the materials for a support, on which the magnetic coating composition is coated, include polyesters such as polyethylene terephthalate, polyethylene-2,6-naphthalate, etc.; polyolefins such as polyethylene, polypropylene, etc.; cellulose derivatives such as cellulose triacetate, etc.; plastics such as polycarbonate, polyimide, polyamide imide, etc. Furthermore, according to the uses, non-magnetic metals such as aluminum, copper, tin, zinc, and non-magnetic alloys of these metals and also plastic films vapor-deposited with a metal such as aluminum, etc., can be also used.

The thickness of the support is generally from 2 to 10 μm, and is preferably from 3 to 20 μm for a magnetic recording tape or generally from 20 to 100 μm for a magnetic disk.

Also, as the form of the non-magnetic support, there are films, tapes, sheets, disks, cards, drums, etc., and the material is selected according to the form of the support.

Also, in the present invention, a back coat may be formed on the opposite side of a support to the magnetic layer carrying side for the purposes of static prevention, transfer prevention, wow flutter prevention, the improvement of the strength of the magnetic recording medium, matting of the back surface, etc.

In the kneading step of the present invention, the mixture for the magnetic coating composition can be kneaded well using the epoxy compound, the vinyl chloride series copolymer having a polar group and a terminal hydroxyl group via an organic side chain group, the polyurethane resin, the organic solvent, etc., in such a small amount that the total amount of from 40 to 70 parts by weight per 100 parts by weight of the ferromagnetic fine particles having a crystallite size of not larger than 350 angstrom, and also the magnetic coating composition having an excellent dispersed state is obtained in the subsequent dispersing step.

An improvement of the mechanical strength of a magnetic layer is generally considered to be the effect by a crosslinking structure by the reaction of an epoxy group and the hydroxyl group of the vinyl chloride copolymer or of the hydroxyl group of a urethane resin and an isocyanate but the fact that the only specific epoxy compound for use in the present invention shows the remarkable effect can not be sufficiently explained by the aforesaid reason only. The aforesaid mechanism has not yet been clarified but it is considered that the specific epoxy compound for use in the present invention acts as a subsidiary role for kneading and dispersing and also functions for the strong bonding of the binders and the magnetic fine particles.

That is, the amine type epoxy compound is liable to adsorb onto ferromagnetic fine particles to improve the dispersibility thereof and, at the same time, the epoxy compound remarkably improves the mechanical strength of the magnetic layer by bonding with the side chain having a terminal hydroxyl group of the vinyl chloride polymer and 3 or more hydroxyl groups of the polyurethane resin have the groups in the molecule.

It is considered that the high mechanical strength of the magnetic layer is obtained by the high reactivity between the amine type epoxy compound and the hydroxyl groups of the binders and also by the structure of the amine type epoxy compound itself. The terminal hydroxyl group in the polyurethane resin only shows a very low reactivity but the polyurethane resin having 3 or more hydroxyl groups in the molecule is liable to react with the amine type epoxy compound.

The ferromagnetic fine particle having the crystallite sizes of not larger than 350 angstrom are sufficiently kneaded and dispersed by the amine type epoxy compound and the polar group of the vinyl chloride copolymer, thereby the squareness ratio (S/Q) and the carrier/noise ratio (C/N) can be improved. Furthermore, by the improvement of the mechanical strength of the magnetic layer, the still durability of the magnetic recording medium is improved, and also by the increase of, in particular, the shearing elongation in the mechanical strength, the occurrence of dropout by repeated running is reduced.

Then, the following examples are intended to illustrate the present invention more practically but not to limit it in any way. In addition, all parts in these examples are by weight.

EXAMPLE 1

| Coating Composition for Magnetic Layer | |
|---|---|
| Ferromagnetic Alloy Particles (A) (composition: Fe 92 wt % and Ni 8 wt %; HC: 1,500 Oe; Acicular ratio: 10/1; pH: 8.3; Crystallite size: 350 angstrom) | 100 parts |
| Vinyl Chloride Series Copolymer (A) (Mw: 4500; —OPO(OH)$_2$: 6 × 10$^{-5}$ eq/g; —O(CH$_2$CH$_2$O)$_7$H: 6 × 10$^{-4}$ eq/g) | 12 parts |
| Polyurethane Resin (A) (Mw: 30,000; —SO$_3$Na: 8 × 10$^{-5}$ eq/g; —OH: 3/molecule) | 8 parts |
| Epoxy Compound (A) | 1.5 parts |

-continued

Coating Composition for Magnetic Layer

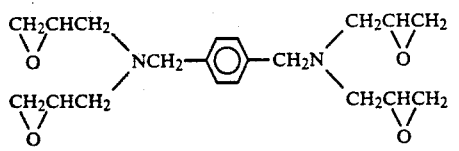

Methyl Ethyl Ketone    30 parts

The aforesaid components were ground and kneaded in an open kneader for 1.5 hours at 50° C. Then, the kneaded mixture was placed in a sand mill together with the following components and they were dispersed for 120 minutes.

Carbon Black (diameter: 30 nm): 2 parts
$\alpha$-$Al_2O_3$ (diameter: 0.08 $\mu$m): 2 parts
Methyl Ethyl Ketone: 200 parts To the dispersion were added the following components and they were mixed by stirring for 20 minutes.

Isoamyl Stearate: 0.5 part
Butoxyethyl Stearate: 1.0 part
Stearic Acid: 2 parts
Polyisocyanate (solid components) 6 parts
(Coronate L, trade name, made by
Nippon Polyurethane Co., Ltd.):
Butyl Stearate: 2 parts
Methyl Ethyl Ketone: 50 parts Thereafter, the resultant mixture was filtered using a filter having a mean pore size of 1 $\mu$m to provide a magnetic coating composition.

The coating composition thus obtained was coated on a polyethylene terephthalate film support having a thickness of 10 $\mu$m at a dry thickness of 3.0 $\mu$m using a reverse roll.

The coated layer of the magnetic coating composition on the non-magnetic support was subjected to a magnetic orientation by magnets of 3,000 gauss in the undried state of the coated layer, dried, and after applying thereto a super calendar treatment, the coated film was slit to 8 mm width to provide an 8 mm video tape.

EXAMPLE 2

By following the same procedure as Example 1 except that ferromagnetic alloy fine particles (B) (Composition: Fe 92 wt% and Ni 8 wt%; Hc: 1,500 Oe; Acicular ratio: 8/1; pH: 9.2; and Crystallite size: 20 angstrom) were used in place of the ferromagnetic alloy fine particles (A), an 8 mm video tape was prepared.

EXAMPLE 3

By following the same procedure as Example 1 except that an epoxy compound B having the following formula was used in place of the epoxy compound A,

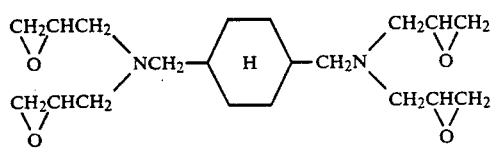

and a polyurethane resin (B) (Mw: 60,000, -OH: 4/molecule) was used in place of the polyurethane resin (A), an 8 mm video tape was prepared.

EXAMPLE 4

By following the same procedure as Example 1 except that an epoxy compound C having the following formula was used in place of the epoxy compound A,

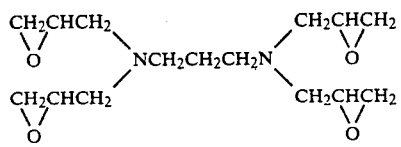

and a polyurethane resin (C) (Mw: 70,000, -OH: 20/molecule, -COOH: $5 \times 10^{-5}$ : eq/g) was used in place of the polyurethane resin (A), an 8 mm video tape was prepared.

EXAMPLE 5

By following the same procedure as Example 1 except that an epoxy compound D having the following formula was used in place of the epoxy compound A,

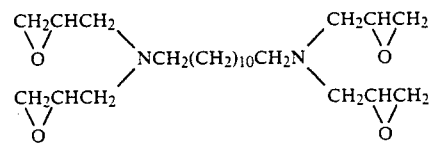

and a vinyl chloride copolymer 8 (Mw: 30,000, $SO_3Na$: $8 \times 10^{-6}$ eq/g, $-OCH_2CH_2CH_2OH$: $4 \times 10^{-6}$) was used in place of the vinyl chloride copolymer A, an 8 mm video tape was prepared.

EXAMPLE 6

By following the same procedure as Example 3 except that a polyurethane resin D (Mw: 20,000, -OPO-$(OH)_2$: $5 \times 10^{-6}$ eq/g, -OH: 30/molecule) was used in place of the polyurethane resin A, an 8 mm video tape was prepared.

COMPARATIVE EXAMPLE 1

By following the same procedure as Example 1 except that a polyurethane resin (Mw: 50,000, -OH: 2/molecule) was used in place of the polyurethane resin A, and 8 mm video tape was prepared.

COMPARATIVE EXAMPLE 2

By following the same procedure as Example 1 except that the epoxy compound A was not used, an 8 mm video tape was prepared.

COMPARATIVE EXAMPLE 3

By following the same procedure as Example 1 except that a vinyl chloride copolymer C (Mw: 50,000, $-SO_3Na$: $6 \times 10^{-5}$ eq/g, -OH (vinyl alcohol): $60 \times 10^{-5}$ eq/g) was used in place of the vinyl chloride copolymer A, an 8 mm video tape was prepared.

COMPARATIVE EXAMPLE 4

By following the same procedure as Example 1 except that the components for the magnetic coating composition were directly dispersed without employing the kneading step, an 8 mm video tape was prepared.

On each of the video tape thus prepared, the characteristics were evaluated as follows.

MAXIMUM RESIDUAL MAGNETIC FLUX DENSITY (BM) AND SQUARENESS RATIO (S/O)

These values were determined by measuring the magnetic characteristics of each video tape at a magnetic field intensity (Hm) of 5 Oe using an oscillation magnetic flux meter (VSM) (manufactured by Toshiba Industries, Ltd.).

CARRIER/NOISE RATIO (C/N)

A signal of 5 MHz was recorded on each video tape using a commercially available 8 mm video tape recorder, Fujix-8 (a trade name, made by Fuji Photo Film Co., Ltd.), a noise generated in the rate of $5\pm1$ MHz in the case of the reproduced signal to the noise was measured. The measurement was carried out using an output level measuring means, NV-870HD (a trade name, manufactured by Matsushita Electric Industrial Co., Ltd.). In addition, the values shown in Table 1 below were relative values with the value of the tape sample obtained in Comparison Example 1 being defined as $\pm 0$ dB.

MECHANICAL STRENGTH OF MAGNETIC LAYER

A tension test was applied on each tape sample and the base of the sample using a tension tester ("Tensilon", a trade name, manufactured by Orientec Co., Ltd.) and the 0.5% elongation modulus (M(0.5)) was determined.

At the same time, the minimum elongation capable of observing cracks in the magnetic layer was determined using an optical microscope (400 magnifications) equipped to the tension tester.

STILL DURABILITY

Signals recorded on each video tape sample was reproduced at $-5°$ C. using an 8 mm video tape recorder, Fujix-8 (trade name, manufactured by Fuji Photo Film Co., Ltd.) and the time required for reducing the output by 10 dB was determined.

INCREASE OF DROPOUT

After repeatedly rerunning each tape sample of a tape running length of 5 minutes at 100 passes at $-5°$ C. using the aforesaid video tape recorder, the number of a dropout of 5 $\mu$sec generated within one minute was determined.

The evaluation results obtained are shown in Table 1.

TABLE 1

| | Bm (Gauss) | S/Q | C/N | Mechanical strength M (0.5) (Kgf/mm$^2$) | Elongation (%) | Still durability (min) | Increase of dropout (number of dropouts) |
|---|---|---|---|---|---|---|---|
| Example 1 | 3,100 | 0.88 | +0.5 | 1,100 | 6.2 | >60 | 3 |
| Example 2 | 3,260 | 0.89 | +1.4 | 1,250 | 5.3 | >60 | 8 |
| Example 3 | 3,080 | 0.88 | +0.6 | 1,080 | 5.8 | >60 | 5 |
| Example 4 | 3,120 | 0.88 | +0.3 | 1,060 | 6.3 | >60 | 2 |
| Example 5 | 3,140 | 0.88 | +0.2 | 1,120 | 6.1 | >60 | 4 |
| Example 6 | 3,100 | 0.88 | +0.4 | 1,090 | 5.9 | >60 | 4 |
| Comparative Example 1 | 3,080 | 0.87 | ±0.0 | 970 | 3.2 | >60 | 59 |
| Comparative Example 2 | 2,760 | 0.85 | −2.1 | 790 | 2.1 | 40 | 82 |
| Comparative Example 3 | 3,100 | 0.87 | −0.2 | 830 | 2.0 | 28 | 123 |
| Comparative Example 4 | 2,620 | 0.84 | −2.8 | 880 | 2.8 | 5 | 96 |

As is clear from the result shown in Table 1, in the samples of the present invention, the dispersibility of the ferromagnetic fine particles is improved and the strength of each magnetic layer can be greatly increased, whereby the electromagnetic conversion characteristics are greatly improved and also the durability is improved.

On the other hand, when the polyurethane resin having two hydroxyl groups (-OH) in the molecule is used as in Comparison Example 1, C/N is low and the reduction of the mechanical strength of the magnetic layer is large. Also, when the amine-type epoxy compound is not used, the reduction in the aforesaid characteristics is observed and also the still durability is reduced. Furthermore, when vinyl alcohol wherein the terminal hydroxyl group is directly bonded to the chain without bonding via an organic side chain group is used in place of the vinyl chloride series copolymer for use in the present invention, the magnetic recording medium is insufficient in the still durability and the increase of dropout.

While the invention has been described in detail and with reference to specific examples thereof, it will be apparent to one skilled in the art that various changes and modifications can be made therein without departing from the spirit and scope thereof.

What is claimed is:

1. A process of producing a magnetic recording medium comprising the steps of kneading ferromagnetic fine particles and a binder using an organic solvent to prepare a kneaded mixture, dispersing said kneaded mixture with the addition of an additional binder and/or an additional organic solvent to prepare a magnetic coating composition, and coating said magnetic coating composition on a non-magnetic support followed by drying, wherein the crystallite size of said ferromagnetic fine particles is not larger than 350 angstrom and said binder used at the kneading step comprises (1) an amine type epoxy compound represented by following formula:

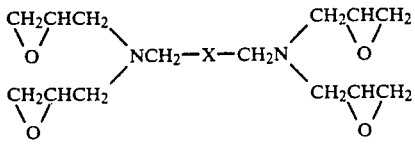

wherein A represents

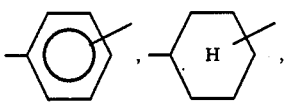

or an alkylene group having from 1 to 10 carbon atoms,
(2) a vinyl chloride copolymer having a polar group and an organic side chain group having a hydroxyl group at the terminal, and
(3) a urethane resin having at least 3 hydroxyl groups in the molecule.

2. A process of producing a magnetic recording medium as claimed in claim 1, wherein the content of said amine type epoxy compound is in the range of from 0.1 to 5 parts by weight per 100 parts by weight of the ferromagnetic fine particles.

3. A process of producing a magnetic recording medium as claimed in claim 1, wherein said organic side chain group having a hydroxyl group at the terminal of said vinyl chloride copolymer is selected from side chain groups represented by formulae (1), (2), and (3):

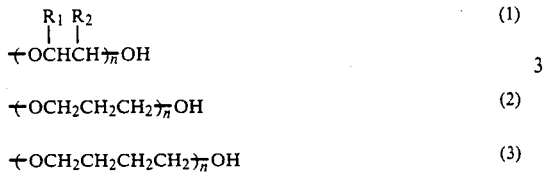

wherein n represents an integer of from 1 to 15 and $R^1$ and $R^2$, which may be the same or different, each represent a hydrogen atom or an alkyl group.

4. A process of producing a magnetic recording medium as claimed in claim 1, wherein said polar group of said vinyl chloride copolymer is selected from the group consisting of $-SO_3M$, $-OSO_3M$, $-PO_3M_2$, $-OPO_3M_2$, or $-CO_2M$ wherein M represents a hydrogen atom, an alkali metal, or ammonium.

5. A process of producing a magnetic recording medium as claimed in claim 1, wherein the content of said organic side chain group having a hydroxyl group at the terminal of the vinyl chloride copolymer is from $1 \times 10^{-5}$ to $\times 10^{-3}$ equivalent per gram of said copolymer.

6. A process of producing a magnetic recording medium as claimed in claim 1, wherein the content of said polar group of said vinyl chloride copolymer is from $1 \times 10^{-7}$ to $1 \times 10^{-3}$ equivalent per gram of the copolymer.

7. A process of producing a magnetic recording medium as claimed in claim 1, wherein the weight average molecular weight of the vinyl chloride copolymer is from 20,000 to 100,000.

8. A process of producing a magnetic recording medium as claimed in claim 1, wherein the content of said vinyl chloride copolymer in the magnetic layer is from 20 to 80% by weight based on the amounts of the total binders.

9. A process of producing a magnetic recording medium as claimed in claim 1, wherein the weight average molecular weight of said polyurethane resin is from 5,000 to 200,000.

10. A process of producing a magnetic recording medium as claimed in claim 1, wherein said polyurethane resin has a glass transition point of not higher than 30° C.

11. A process of producing a magnetic recording medium as claimed in claim 1, wherein the content of said polyurethane resin in the magnetic layer is from 10 to 70% by weight to the total amounts of the binders.

12. A process of producing a magnetic recording medium as claimed in claim 1, wherein said ferromagnetic fine particles are ferromagnetic alloy fine particles.

13. A process of producing a magnetic recording medium as claimed in claim 1, wherein the content of the total binder is from 10 to 100 parts by weight per 100 parts by weight of said ferromagnetic fine particles.

* * * * *